United States Patent
Inayama

(10) Patent No.: US 8,752,866 B2
(45) Date of Patent: Jun. 17, 2014

(54) MOUNTING STRUCTURE OF COMPONENT TO EXHAUST PIPE

(75) Inventor: Yoshisato Inayama, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 41 days.

(21) Appl. No.: 13/297,437

(22) Filed: Nov. 16, 2011

(65) Prior Publication Data

US 2012/0128409 A1     May 24, 2012

(30) Foreign Application Priority Data

Nov. 18, 2010 (JP) ................................ 2010-258359

(51) Int. Cl.
*F16L 41/12*     (2006.01)
*G01M 15/00*     (2006.01)

(52) U.S. Cl.
USPC ........... 285/191; 285/206; 285/208; 285/219; 73/114.72

(58) Field of Classification Search
USPC ......... 285/191, 194, 205, 206, 207, 208, 213, 285/215, 219, 220; 73/114.71, 114.69, 73/114.72, 114.73
See application file for complete search history.

(56) References Cited

U.S. PATENT DOCUMENTS

| | | | | |
|---|---|---|---|---|
| 1,689,575 A | * | 10/1928 | Winn | 285/18 |
| 1,809,250 A | * | 6/1931 | Pendleton | 285/206 |
| 2,441,009 A | * | 5/1948 | Cunningham | 285/200 |
| 2,688,497 A | * | 9/1954 | Brisack | 285/200 |
| 3,847,778 A | * | 11/1974 | Riddel | 204/427 |
| 4,140,337 A | * | 2/1979 | Arcella et al. | 285/3 |
| 4,597,850 A | * | 7/1986 | Takahasi et al. | 204/426 |
| 5,665,318 A | | 9/1997 | Rembold et al. | |
| 5,679,926 A | * | 10/1997 | Maloney et al. | 174/652 |
| 6,676,168 B2 | * | 1/2004 | McAliley | 285/206 |
| 7,562,907 B2 | * | 7/2009 | Hutton | 285/219 |
| 7,874,149 B2 | | 1/2011 | Momosaki et al. | |

(Continued)

FOREIGN PATENT DOCUMENTS

| | | |
|---|---|---|
| CN | 1792700 A | 6/2006 |
| DE | 2330679 A1 | 3/1975 |

(Continued)

OTHER PUBLICATIONS

Chinese Office Action, dated Dec. 12, 2013, which issued during the prosecution of Chinese Patent Application No. 201110367016.2, which corresponds to the present application.

(Continued)

*Primary Examiner* — James Hewitt
(74) *Attorney, Agent, or Firm* — Troutman Sanders LLP

(57) ABSTRACT

When an exhaust gas sensor is mounted to an exhaust pipe into which exhaust gas from an engine is introduced, an intermediate member is made to intervene between the exhaust gas sensor and a boss provided in an exhaust manifold, the intermediate member being fastened to the boss by bolts and the exhaust gas sensor being screwed into a screw hole formed in the intermediate member, so that a sensor portion at a front end of the exhaust gas sensor is inserted into the inside of the exhaust pipe. Though the screw hole formed in the intermediate member is to be exposed to high-temperature gas of the exhaust manifold, stainless steel, whose high-temperature strength is high, being used for the intermediate member, a female screw of the screw hole is hard to be softened and an occurrence of torque down can be suppressed.

7 Claims, 2 Drawing Sheets

(56) References Cited

U.S. PATENT DOCUMENTS

2007/0039317 A1 2/2007 Momosaki et al.
2007/0119156 A1 5/2007 Hill, Jr. et al.
2010/0307001 A1 12/2010 Hill, Jr. et al.

FOREIGN PATENT DOCUMENTS

| | | | |
|---|---|---|---|
| DE | 4436415 | A1 | 4/1996 |
| EP | 1180670 | A1 | 2/2002 |
| EP | 1643096 | A1 | 4/2006 |
| EP | 1793100 | A1 | 6/2007 |
| JP | 2004-239716 | A | 8/2004 |
| JP | 2006-299927 | A | 11/2006 |
| JP | 2007-023850 | A | 2/2007 |
| JP | 2007-51571 | A | 3/2007 |

OTHER PUBLICATIONS

Extended European Search Report, dated Feb. 17, 2014, which issued during the prosecution of European Patent Application No. 11185384.2, which corresponds to the present application.

* cited by examiner

MOUNTING STRUCTURE OF COMPONENT TO EXHAUST PIPE

CROSS-REFERENCE TO RELATED APPLICATIONS

This application is based upon and claims the benefit of priority of the prior Japanese Patent Application No. 2010-253359, filed on Nov. 18, 2010, the entire contents of which are incorporated herein by reference.

BACKGROUND OF THE INVENTION

1. Field of the Invention

The present invention relates to a mounting structure of a component to an exhaust pipe, the structure being suitable to be used in a case that a material whose high-temperature strength is low is used for an exhaust pipe.

2. Description of the Related Art

In a vehicle such as a motorcycle, a low specific gravity material such as titanium and a titanium alloy is sometimes used for an exhaust pipe in order to save weight. For example, Patent Document 1 discloses a configuration in which a catalyst pipe is formed of stainless steel and an exhaust manifold connected to the catalyst pipe is formed of titanium or a titanium alloy, whose specific gravity is smaller than that of the catalyst pipe.

[Patent Document 1] Japanese Laid-open Patent Publication No. 2007-51571

In a vehicle to which an engine is mounted, an air-fuel ratio sensor is sometimes mounted to an exhaust pipe in order to perform air-fuel ratio feedback control, for example. More specifically, the air-fuel ratio sensor is screwed into a boss provided in a predetermined position of the exhaust pipe and a sensor portion at a front end of the air-fuel ratio sensor is inserted into the inside of the exhaust pipe.

In this case, if the exhaust pipe is formed of titanium or a titanium alloy, it is necessary that the boss provided in the exhaust pipe is also formed of titanium or a titanium alloy because of difficulty in welding titanium and a dissimilar metal. However, since a screw portion formed in the boss for screwing the air-fuel ratio sensor thereinto is exposed to high-temperature gas, usage of titanium or a titanium alloy, which is low in a high-temperature strength, for the boss leads to a possibility that the screw portion formed in the boss is softened and that torque down occurs.

SUMMARY OF THE INVENTION

The present invention is made in view of the above, and an object of the present invention is to achieve weight saving by using a low specific gravity material such as titanium for an exhaust pipe and to prevent loosening of screwing of a component mounted to the exhaust pipe.

A mounting structure of a component to an exhaust pipe of the present invention is a mounting structure of a component to an exhaust pipe into which exhaust gas from an engine is introduced, and is characterized in that the mounting structure has an intermediate member which is made to intervene between the component and a mounting portion provided in the exhaust pipe, wherein the component is screwed into the intermediate member and a front end of the component is inserted into the inside as the exhaust pipe.

Further, the mounting structure of the component to the exhaust pipe of the present invention is characterized also in that the component is an exhaust gas sensor detecting a state of exhaust gas of the exhaust pipe, that the exhaust gas sensor is screwed into a screw hole formed in the intermediate member, and that a sensor portion at the front end of the exhaust sensor is inserted into the inside of the exhaust pipe.

Further, the mounting structure of the component to the exhaust pipe of the present invention is characterized also in that the intermediate member is fastened to the mounting portion by a bolt and that a screw hole into which the bolt is screwed has a pouch-like shape whose bottom portion is closed. It is preferable that the bolts are disposed at two places or more around the component.

Further, the mounting structure of the component to the exhaust pipe of the present invention is characterized also in that the intermediate member is made of a material whose high-temperature strength is higher compared with that of the mounting portion.

Further, she mounting structure of the component to the exhaust pipe of the present invention is characterized also in that a sealing member is sandwiched and fixed between the mounting portion and the intermediate member. It is preferable that the sealing member is a ring-shaped gasket through which the component is inserted, and that the intermediate member is pressed to the gasket and comes to a state of being alienated from the mounting portion.

Further, the mounting structure of the component to the exhaust pipe of the present invention is characterized also in that a sealing member is sandwiched and fixed between the intermediate member and the component.

DETAILED DESCRIPTION OF THE PREFERRED EMBODIMENTS

Hereinafter, a suitable embodiment of the present invention will be described with reference to the attached drawings.

Figure 1:
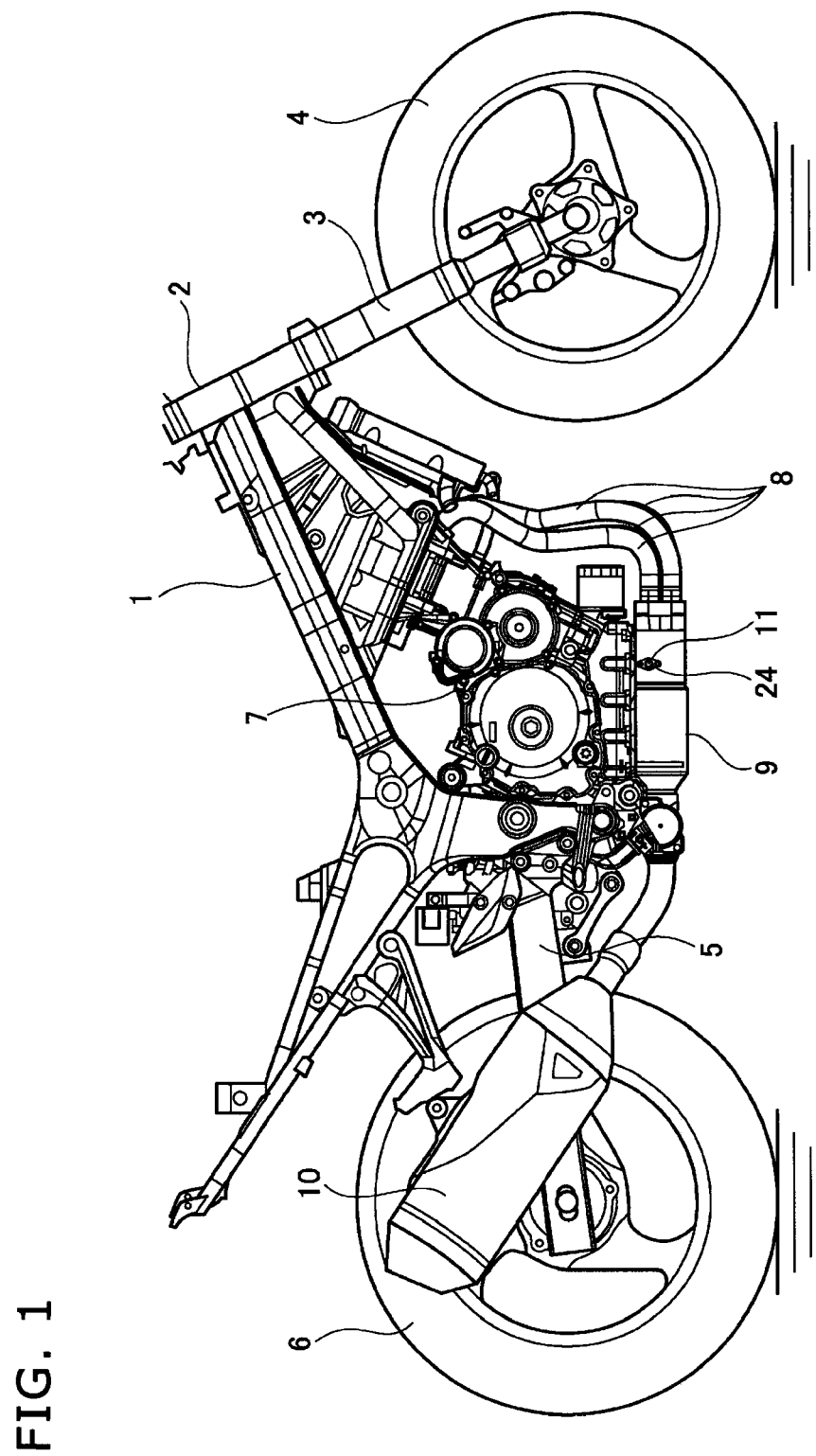
FIG. 1 is a side view illustrating substantial parts of a motorcycle.

FIG. 1 is a right side view illustrating substantial parts of a motorcycle to which the present invention is applicable. Two right and left front forks 3 supported rotatably right, and left by a steering head pipe 2 are provided in a front portion of a right, and left pair of vehicle body frames 1 made of steel or an aluminum alloy material. The right and left pair of vehicle body frames 1 is joined in a vehicle's front, and the steering head pipe 2 is provided in a joint portion, a steering center being disposed therein. A not-shown handle is fixed to an upper end of the front fork 3, and a front wheel 4 is supported rotatably in a lower portion of the front fork 3.

The vehicle body frame 1 branches into right and left two parts from the steering head pipe toward a back, and each extends while inclining downward toward the back. A swing arm 5 is swingably joined to an end portion of the vehicle body frame 1, and a rear wheel 6 is rotatably supported by a rear end of the swing arm 5. The rear wheel 6 is rotatably driven via a driven sprocket around which a chain to transmit a motive power of an engine is wound.

An engine unit 7 is mounted in a predetermined region of the vehicle body frame 1. The engine unit 7 is a 4-cycle 4-cylinder engine, and a branch pipe 8 is connected to an exhaust port of each cylinder. The branch pipe 8 of each cylinder extends downward in a front of the engine unit 7 and is joined to an exhaust manifold 9 disposed below the engine unit 7. Exhaust gas after combustion in the engine passes through a catalyst in the exhaust manifold 9 in a state of flowing together in the exhaust manifold 9 from the respective branch pipes 8, and thereafter is discharged from a muffler 10.

A fuel tank is mounted above the engine unit 7 and seats (rider seat and a tandem seat) are continuously provided behind the fuel tank, illustration thereof omitted here. With regard to a vehicle exterior, a streamlined external form of the vehicle is formed by a cowling.

Figure 2:
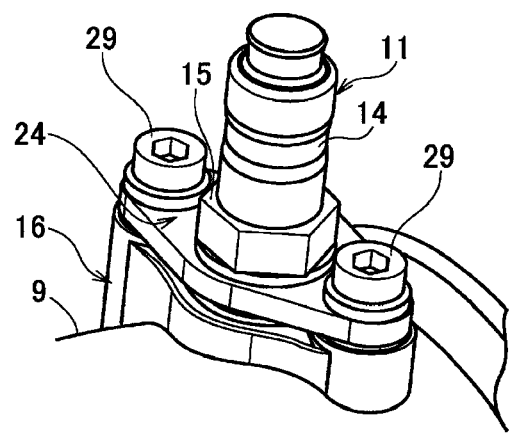
FIG. 2 is a perspective view illustrating a surrounding of a mounting place of an exhaust gas sensor.

Here, as is also illustrated in FIG. 2, an exhaust gas sensor 11 is mounted to the exhaust manifold 9 into which exhaust gas is introduced from the engine unit 7. The exhaust gas sensor 11 has a stick-like shape and insertedly provided in the exhaust pipe 9 in a manner to be oriented obliquely downward from a right side of the vehicle in an upstream side of the catalyst. Disposing the exhaust gas sensor 11 obliquely as above can prevent the exhaust gas sensor 11 from contacting the ground even when a vehicle body is tilted (banked) to the right side during driving.

Figure 3:
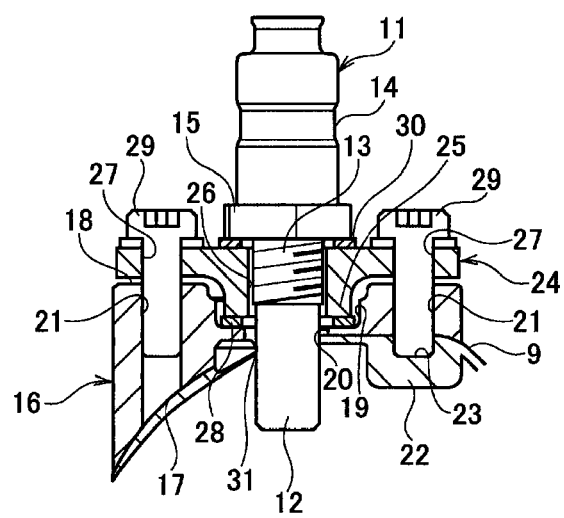
FIG. 3 is a cross-sectional view illustrating a mounting structure of the exhaust gas sensor.

As illustrated in FIG. 3, the exhaust gas sensor 11 is constituted by a sensor portion 12 at a front end, a screw portion 13 in the middle, and a base portion 14 at a rear end. A male screw is processed in the screw portion 13, while a bolt head 15 is provided in a screw portion 13 side of the base portion 14.

Further, a boss (pedestal) 16 is welded (for example, by copper welding) and fixed to an outer peripheral surface of the exhaust manifold 9 as a mounting portion of the exhaust gas sensor 11. In the present embodiment, titanium or a titanium alloy being a low specific gravity material is used for the exhaust manifold 9 in order to achieve weight saving, and the boss 16 welded to the exhaust manifold 9 is also made of titanium or a titanium alloy.

The boss 16 includes a lower surface 17 curving in a manner to be along the outer peripheral surface of the exhaust manifold 9 and an upper surface 18. In the boss 16, a recessed portion 19 is formed in a center portion of the upper surface 18, and on a bottom surface of the recessed portion 19 an opening 20 through which the exhaust gas sensor 11 is inserted is formed. Further, screw holes 21 in which female screws are processed are formed in both sides of the recessed portion 19 in the boss 16. Here, a bottom portion of one (in a left side in FIG. 3) screw hole 21 has a pouch-like shape which is closed by the outer peripheral surface of the exhaust manifold 9. Further, with regard so the other (in a right side in FIG. 3) screw hole 21, a bolt screwing thereinto is to penetrate through the exhaust manifold 9 because of stroke, but a thick portion 22 is formed in the exhaust manifold 9 and a screw hole 23 communicating to the screw hole 21 is formed in the thick portion 22. In other words, the other screw hole 21 has a pouch-like shape whose bottom portion is closed correlatively with the screw hole 23.

Here, in mounting the exhaust gas sensor 11 to the boss 16, the exhaust gas sensor 11 is not directly mounted to the boss 16 but a plate-shaped intermediate member 24 is made to intervene between the exhaust gas sensor 11 and the boss 16. An upper surface of the intermediate member 24 is entirely flat, while a lower surface thereof is flat but has a protruding portion 25 formed in a center portion. The protruding portion 25 can be inserted into the recessed portion 19 of the boss 16, and a screw hole 26 in which a female screw is processed is formed in a manner to vertically penetrate through the protruding portion 25. Further, in the intermediate member 24, screw holes 27 corresponding to the screw holes 21 of the boss 16 respectively are formed in both sides of the screw hole 26. The intermediate member 24 as above is made of a material whose high-temperature strength is higher compared with titanium and a titanium alloy, that is, stainless steel, for example.

When the intermediate member 24 is mounted to the boss 16, the protruding portion 25 of the intermediate member 24 is inserted into the recessed portion of the boss 16. On this occasion, a ring-shaped gasket 28 is sandwiched and fixed between a front end surface of the protruding portion 25 and a bottom surface of the recessed portion 19. Then, hexagon socket bolts 29 are inserted into the screw holes 27, 21 and fastened, thereby joining the intermediate member 24 to the boss 16. In this state, the intermediate member 24 pressure-contacts the gasket 28 and comes to a state of being alienated from the boss 16 (state of floating). It should be noted that for the gasket 28, one made of a metal, copper for example, is used.

Further, when the exhaust gas sensor 11 is mounted, the exhaust gas sensor 11 is inserted into the screw hole 26 of the intermediate member 24 and the screw portion 13 is screwed thereinto. On this occasion, a ring-shaped gasket 30 is sandwiched and fixed between the upper surface of the intermediate member 24 and a bolt head portion 15 of the exhaust gas sensor 11. Then, the sensor portion 12 at the front end of the exhaust gas sensor 11 is inserted through the gasket 28, the opening 20 of the boss 16, and further an opening 31 formed in the exhaust manifold 9, thereby to be inserted into the inside of the exhaust manifold 9. It should be noted that for the gasket 30, one made of a metal, copper for example, is used.

A mounting structure of the exhaust gas sensor as above has a configuration in which the intermediate member 24 is made to intervene and is sandwiched between the exhaust gas sensor 11 and the boss 16 provided in the exhaust manifold 9 and the exhaust sensor 11 is screwed into the intermediate member 24. The screw hole 26 formed in the intermediate member 24 is exposed to high-temperature gas of the exhaust manifold 9, but the female screw of the screw hole 26 is hard to be softened since stainless steel having a high high-temperature strength is used for the intermediate member 24, so that an occurrence of torque down can be suppressed. Therefore, it is possible to use a low specific gravity material such as titanium for the exhaust pipe 9 in order for weight saving and to prevent loosening of screwing of the exhaust gas sensor 11. Further, if a material with a small difference in linear expansion coefficients from the intermediate member 24 is used for the screw portion 13 of the exhaust gas sensor 11, a generation of a thermal stress can be suppressed.

Further, since the screw hole 21 for mounting the intermediate member 24 to the boss 16 has a pouch like shape in which the bottom portion thereof is closed, high-temperature gas of the exhaust manifold 9 does not contact the screw hole 21. Therefore, the female screw of the screw hole 21 is hard to be softened, so that an occurrence of torque down can be suppressed. It should be noted that in the present embodiment a configuration in which the screw hole 21 is closed by the outer peripheral surface or the thick portion 22 of the exhaust manifold 9 is shown, but it is possible that a bottom portion is left by forming a screw hole 21 in a manner not to penetrate through a boss 16.

Since the gasket 28 is sandwiched and fixed between the recessed portion 19 of the boss 16 and the protruding portion 25 of the intermediate member 24 as a sealing member, it is possible to prevent exhaust gas of the exhaust manifold 9 from leaking outside. Further, since the gasket 30 is sandwiched and fixed between the intermediate member 24 and the exhaust gas sensor 11 as a sealing member, it is possible to prevent the exhaust gas flowing from the exhaust manifold 9 to the screw hole 26 of the intermediate member 24 from leaking outside. In this case, since the intermediate member 24 having a high high-temperature strength presses the gaskets 28, 30, plastic deformation does not occur on a pressing surface even under high-temperature environment, so that a contact pressure can be secured. In addition, the intermediate member 24 pressure-contacts the gasket 28 and comes to a state of being alienated (state of floating) from the boss 16, and thus a stable sealing property can be secured and a space between the intermediate member 24 and the boss 16 has a heat insulating effect, so that it is possible to suppress conduction of heat from the exhaust manifold 9 and the boss 16, whose temperatures become high, to the intermediate member 24.

Further, whereas the exhaust gas sensor 11 is screwed into the intermediate member 24 at one place (screw portion 13), the intermediate member 24 is fastened to the bolt 16 at more places than one, that is, two places (two bolts 29). As described above, by making the number of fastening points (two points being bolts 29) in a low-temperature environment side larger in comparison with the number of fastening points (one point being the screw portion 13) in a high-temperature environment side, an occurrence of torque down can be suppressed. Further, a screw nominal diameter of the bolt 29 to fasten the intermediate member 24 to the boss 16 is smaller than a screw nominal diameter of the screw portion 13 to fasten the exhaust gas sensor 11 to the intermediate member 24. As described above, by making the screw nominal diameter of the bolt 29 in the low temperature environment side smaller than the screw nominal diameter of the screw portion 13 in the high temperature environment side, an occurrence of torque down can be suppressed.

Further, by disposing the bolt 29 offset from a center axis of the gasket 28 around the exhaust gas sensor 11, it is possible to generate a contact pressure surely in a portion desired to be sealed functionally. For example, by disposing a plurality of bolts 29 symmetrically around the exhaust gas sensor 11, it is possible to press the intermediate member 24 to the gasket 28 evenly.

It should be noted that the exhaust gas sensor detecting a state of exhaust gas in the present invention can be an oxygen sensor used as an air-fuel ratio sensor, a wide-area air-fuel ratio sensor, or another sensor.

According to the present invention, since it is configured that the intermediate member is made to intervene between the component and the mounting portion provided in the exhaust pipe and that the component is screwed into the intermediate member, an occurrence of torque down can be suppressed even if a material whose high-temperature strength is low is used for the exhaust pipe and the mounting portion provided therein. Therefore, it is possible to achieve weight saving by using a low specific gravity material such as titanium for the exhaust pipe and to prevent loosening of screwing of the component mounted to the exhaust pipe.

Hereinabove, the present invention is described together with various embodiments, but the present invention is not limited only to those embodiments and alteration and the like is possible in a scope of the present invention. For example, in the above-described embodiment, the exhaust gas sensor 11 is exemplified as a component referred to in the present invention, but the present invention can be applied to components in general to be mounted to an exhaust pipe into which exhaust gas is introduced from an engine.

What is claimed is:

1. A mounting structure with a component for mounting the component of a component to an exhaust pipe into which exhaust gas is introduced from an engine, the mounting structure comprising:
    an intermediate member which is made to intervene between the component and a mounting portion provided with the exhaust pipe, the mounting portion being a separate portion from the exhaust pipe, wherein
    the component having a screw portion at a middle portion of the component that is screwed into said intermediate member and a front end of the component is inserted into an inside of the exhaust pipe,
    said intermediate member is fastened to the mounting portion by at least one bolt and has a protruding portion provided at a center portion of a surface of the intermediate member, the surface facing the mounting portion,
    a space is provided between the surface of the intermediate member and the mounting portion, and
    at least a part of the protruding portion of the intermediate member is provided within the mounting portion.

2. The mounting structure according to claim 1, wherein the component is an exhaust gas sensor that detects a state of exhaust gas of the exhaust pipe,
    a screw portion of the exhaust gas sensor is screwed into a screw hole formed in said intermediate member, and
    a sensor portion at the front end of the exhaust sensor is inserted into the inside of the exhaust pipe.

3. The mounting structure according to claim 1, wherein at least one screw hole into which the bolt is screwed has a pouch shape whose bottom portion is closed.

4. The mounting structure according to claim 3, wherein said intermediate member is fastened to the mounting portion by two or more bolts, and
    the bolts are disposed at two places or more around the component.

5. The mounting structure according to claim 1, wherein the exhaust pipe and the mounting portion are made of either titanium or a titanium alloy and
    said intermediate member is made of stainless steel.

6. The mounting structure according to claim 1, wherein a sealing member is sandwiched and fixed between the mounting portion and said intermediate member,
    the sealing member is a ring-shaped gasket through which the component is inserted, and
    said intermediate member is pressed to the gasket at a front end surface of the protruding portion and comes to a state of being alienated from the mounting portion.

7. The mounting structure according to claim 1, wherein a sealing member is sandwiched and fixed between said intermediate member and the component.

* * * * *